United States Patent [19]
Yoshida

[11] Patent Number: 5,473,549
[45] Date of Patent: Dec. 5, 1995

[54] METHOD FOR DRAWING CIRCUIT DIAGRAMS

[75] Inventor: Yoshihiro Yoshida, Kawasaki, Japan

[73] Assignee: Kabushiki Kaisha Toshiba, Kawasaki, Japan

[21] Appl. No.: 247,077

[22] Filed: May 20, 1994

[30] Foreign Application Priority Data

May 21, 1993 [JP] Japan ................................. 5-120245

[51] Int. Cl.⁶ .................................................. H05K 13/08
[52] U.S. Cl. ............................................ 364/489; 364/488
[58] Field of Search .................................. 364/489, 490, 364/491, 488, 578; 371/23

[56] References Cited

U.S. PATENT DOCUMENTS

| | | | |
|---|---|---|---|
| 4,833,619 | 5/1989 | Shimizu et al. | 364/489 |
| 4,942,536 | 7/1990 | Watanabe et al. | 364/490 |
| 5,041,986 | 8/1991 | Tanishita | 364/489 |
| 5,150,308 | 9/1992 | Hooper et al. | 364/489 |
| 5,202,841 | 4/1993 | Tani | 364/491 |
| 5,258,919 | 11/1993 | Yamanouchi et al. | 364/489 |
| 5,262,959 | 11/1993 | Chkoreff | 364/489 |
| 5,267,175 | 11/1993 | Hooper | 364/489 |
| 5,303,161 | 4/1994 | Burns et al. | 364/490 |
| 5,331,569 | 7/1994 | Iijima | 364/489 |
| 5,333,032 | 7/1994 | Matsumoto et al. | 364/489 |

*Primary Examiner*—Kevin J. Teska
*Assistant Examiner*—Russell W. Frejd
*Attorney, Agent, or Firm*—Oblon, Spivak, McClelland, Maier, & Neustadt

[57] ABSTRACT

A method for drawing a circuit diagram within a semiconductor circuit using a computer. The drawing method uses a drawing device for drawing a circuit diagram and a memory for storing symbol data representative of symbols of fundamental elements constituting the circuit diagram and attribute data representative of the fundamental elements. The fundamental elements include a bipolar transistor, an FET, a resistor, a capacitor, a diode, wiring, and a pad. The method includes the steps of judging whether or not, among fundamental elements of the same type, the symbol represented by the symbol data corresponding to the attribute data of the fundamental element is presently displayed by the drawing device, judging whether or not, when the symbol corresponding to the attribute data is not presently displayed, the symbol data representative of the symbol corresponds to the attribute data is stored in the memory, and changing, when the symbol data representative of the symbol corresponds to the attribute data stored in the memory, the symbol represented by the symbol data into the symbol presently displayed to express the changed symbol on the drawing device.

16 Claims, 8 Drawing Sheets

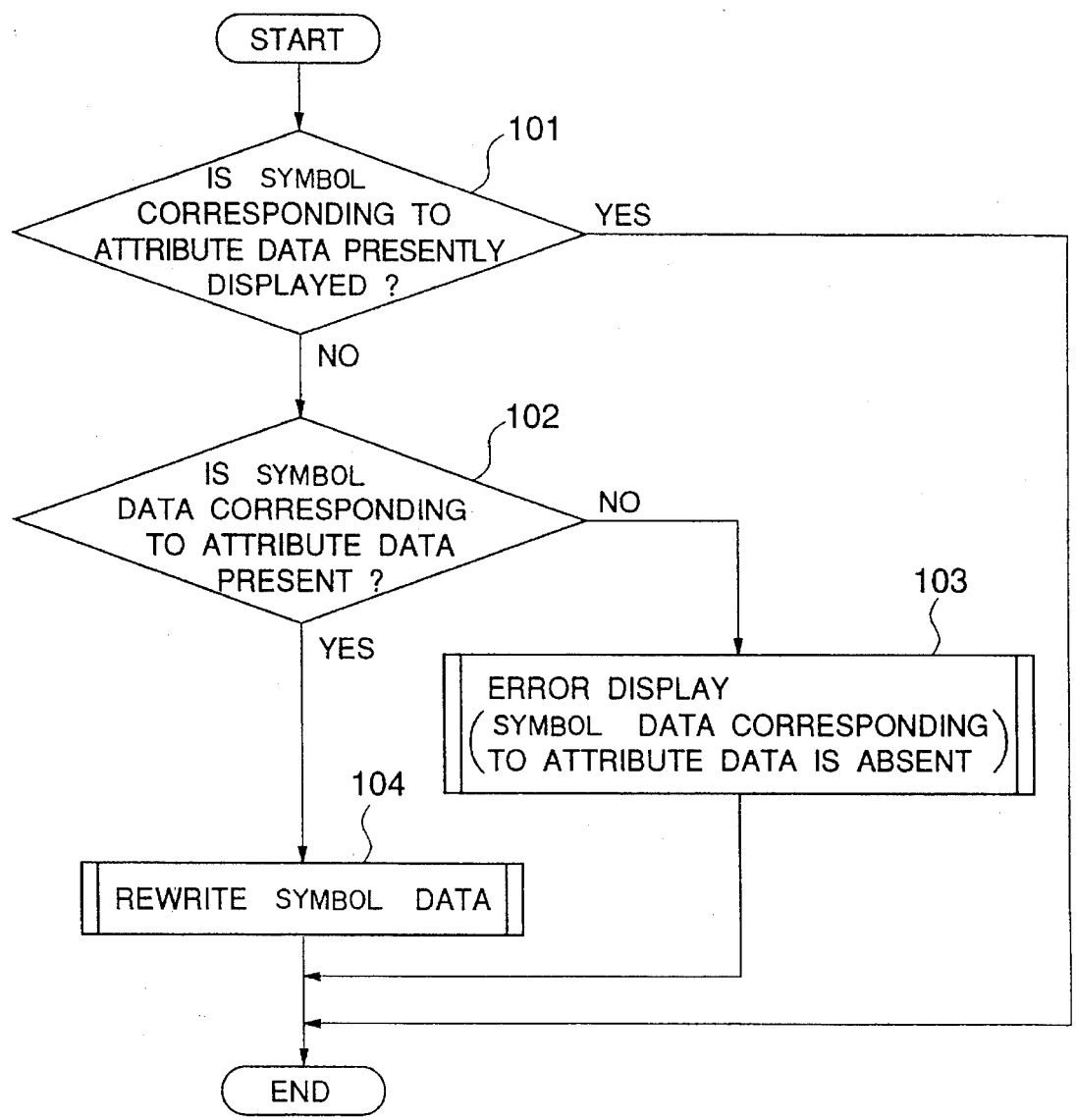
F I G. 1

METHOD FOR DRAWING CIRCUIT DIAGRAMS

BACKGROUND OF THE INVENTION

The present invention relates to a method for drawing a circuit diagram within a semiconductor circuit using a computer.

In recent years, in designing the circuit internally of a semiconductor circuit, a circuit diagram has been outputted to a display picture plane of a computer, a plotter or a printer. Fundamental elements constituting the circuit diagram include a bipolar transistor, an FET (FIELD EFFECT TRANSISTOR), a resistor, a capacitor, a diode, a wiring, a pad and so on. A symbol of the respective fundamental element is displayed on the picture plane. Attribute data representative of attributes of the respective fundamental elements include, for example, in the case where the fundamental element is a transistor, polarities, and an area, a shape and the number of emitters; and, in the case where the fundamental element is a resistor, materials, specific resistance, etc.

In the case where the symbol and the attribute data of the respective fundamental elements are changed on the outputted circuit diagram, conventionally, the following method has been employed.

FIG. 10 shows symbols of the circuit diagrams outputted to the picture plane or the like. A symbol of a transistor presently displayed on a picture plane 71 is once deleted as shown in a picture plane 72, a symbol of a transistor after changed is displayed as shown in a picture plane 73, and thereafter the attribute data is corrected.

As an alternative method, a symbol of the outputted fundamental element is deleted, and a symbol combined with attribute data to be changed is selected and outputted.

However, in the case where the attribute data of the fundamental element whose symbol is displayed on the picture plane or the like is changed, a user had to be conscious of the presence of the symbol. In the above-described first method, the change of the symbol and the change of the attribute data have to be carried out individually. Therefore, the symbol is sometimes in discord with the attribute data such that the attribute data is not corrected despite the fact that the symbol is changed.

In the above-described second method, it has been necessary to select and display a symbol corresponding to the attribute data to be changed after the symbol presently displayed has been once deleted.

As described above, it is a matter for reflection for an user whether or not, when the attribute data is changed, the symbol corresponds to the attribute data after changed, thus causing the heavy burden.

SUMMARY OF THE INVENTION

The present invention has been achieved in view of the aforementioned circumstances. It is an object of the present invention to provide a method for drawing a circuit diagram which can easily change attribute data without taking a symbol into consideration and which can output an accurately corresponding symbol and attribute data.

According to the present invention, there is provided a method for drawing a circuit diagram using drawing means for drawing a circuit diagram, and memory means for storing symbol data representative of symbols of fundamental elements constituting the circuit diagram and attribute data representative of attributes of the fundamental elements, the fundamental elements including a bipolar transistor, an FET, a resistor, a capacitor, a diode, a wiring and a pad, the method comprising the steps of: judging whether or not, in the fundamental elements of the same kind, the symbol represented by the symbol data corresponding to the attribute data of the fundamental element is presently displayed by the drawing means; judging whether or not, when the symbol corresponding to the attribute data is not presently displayed, the symbol data representative of the symbol corresponding to the attribute data is stored in the memory means; and replacing, when the symbol data representative of the symbol corresponding to the attribute data is stored in the memory means, the symbol presently displayed with the symbol represented by the symbol data corresponding to the attribute data to express the changed symbol on the drawing means.

Whether or not, in the fundamental elements of the same kind, the symbol represented by the symbol data corresponding to the attribute data is presently displayed by the drawing means is judged. In the case where the symbol corresponding to the attribute data is not displayed such as the case where the attribute data is changed, whether or not the symbol data representative of the corresponding symbol is stored in the memory means is judged. In the case where the corresponding symbol is stored, this symbol is changed to the presently displayed symbol and expressed. In this way, the symbol is automatically changed to the corresponding symbol with the change of the attribute data.

The attribute data of the bipolar transistor may include at least one of the polarity of the transistor, the area of an emitter, the shape of an emitter, the number of emitters, the shape of a base, the area of a base, the shape of a collector or the area of a collector.

The attribute data of the FET may include at least one of the construction of a transistor, the length of a gate, the width of a gate, the number of gates, the kind of material for a gate electrode, the shape of a source electrode, and the shape of a drain electrode.

The attribute data of the resistor may include at least one of the material of a resistor, the resistivity (sheet resistance) and the construction thereof.

The attribute data of the capacitor may include at least one of the kind of a capacitor, construction of a capacitor, the dielectric substance, and the electrode substance.

The attribute data of the diode may include at least one of the area, construction and use of the diode.

The attribute data of the wiring may include at least one of the material of a wiring, the current set value and the use thereof.

The attribute data of the pad may include at least one of the construction of a pad, the size of a pad, the shape of a pad, the purpose for using a pad, the presence or absence of a pad protective element, the kind of pad protective elements, the number of pad protective elements, the area of a pad protective element, and the polarities of a pad protective element.

BRIEF DESCRIPTION OF THE DRAWINGS

In the accompanying drawings:

FIG. 1 is a flowchart showing the processing procedure of a circuit diagram drawing method according to an embodiment of the present invention;

DESCRIPTION OF THE PREFERRED EMBODIMENTS

One embodiment of the present invention will be described hereinbelow with reference to the drawings.

Figure 3:
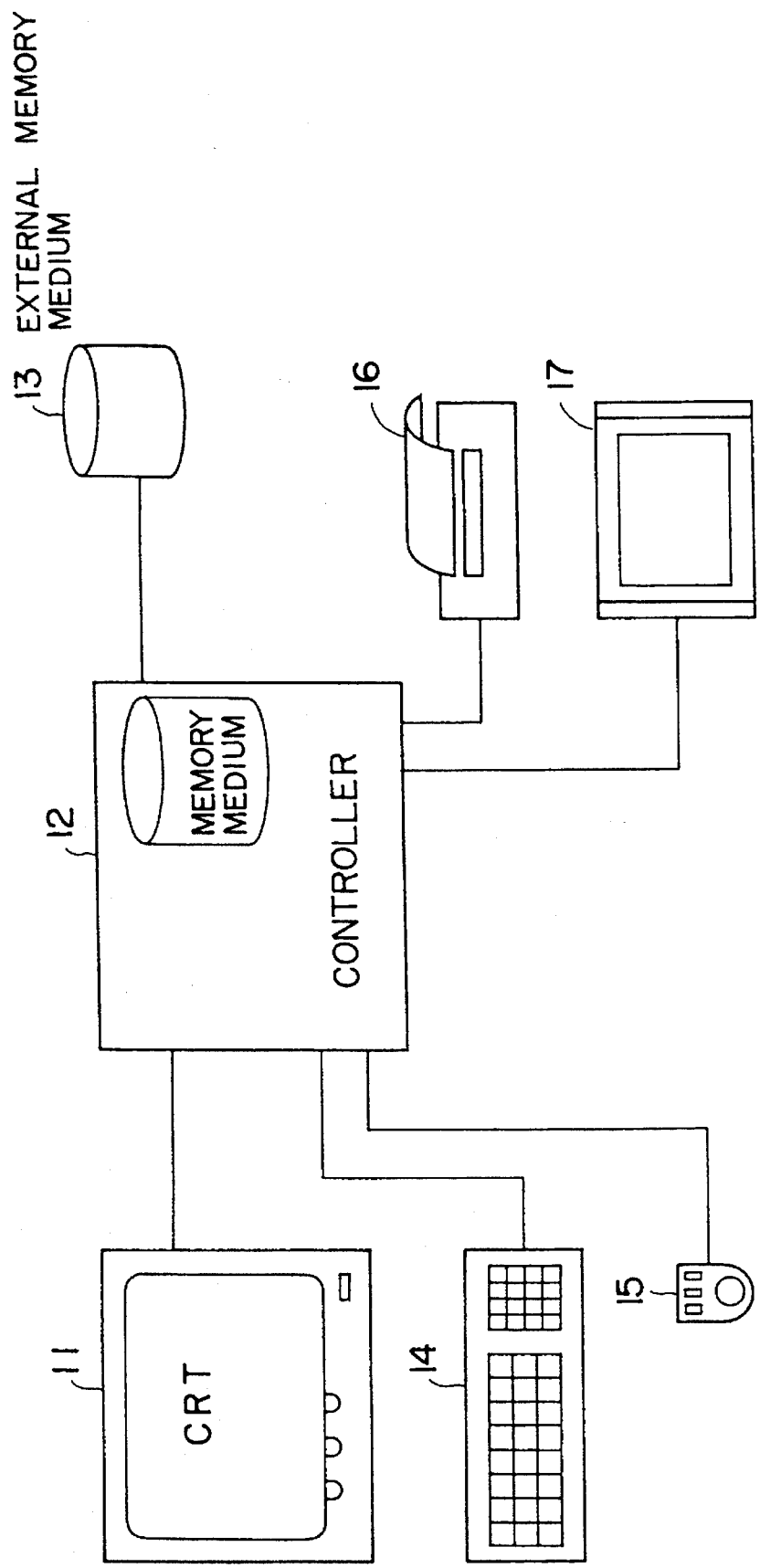
FIG. 3 is an explanatory view showing a structural example of devices suitable for use in carrying out a circuit diagram drawing method according to an embodiment of the present invention.

FIG. 3 shows a structural example of a system used in the circuit diagram drawing method according to the present embodiment. This system comprises a controller 12 having a memory medium therein, an external memory medium 13, a keyboard 14 and a mouse 15 as data input means, and a CRT display 11, a printer 16 and a plotter 17 as a circuit diagram output section.

Figure 4:
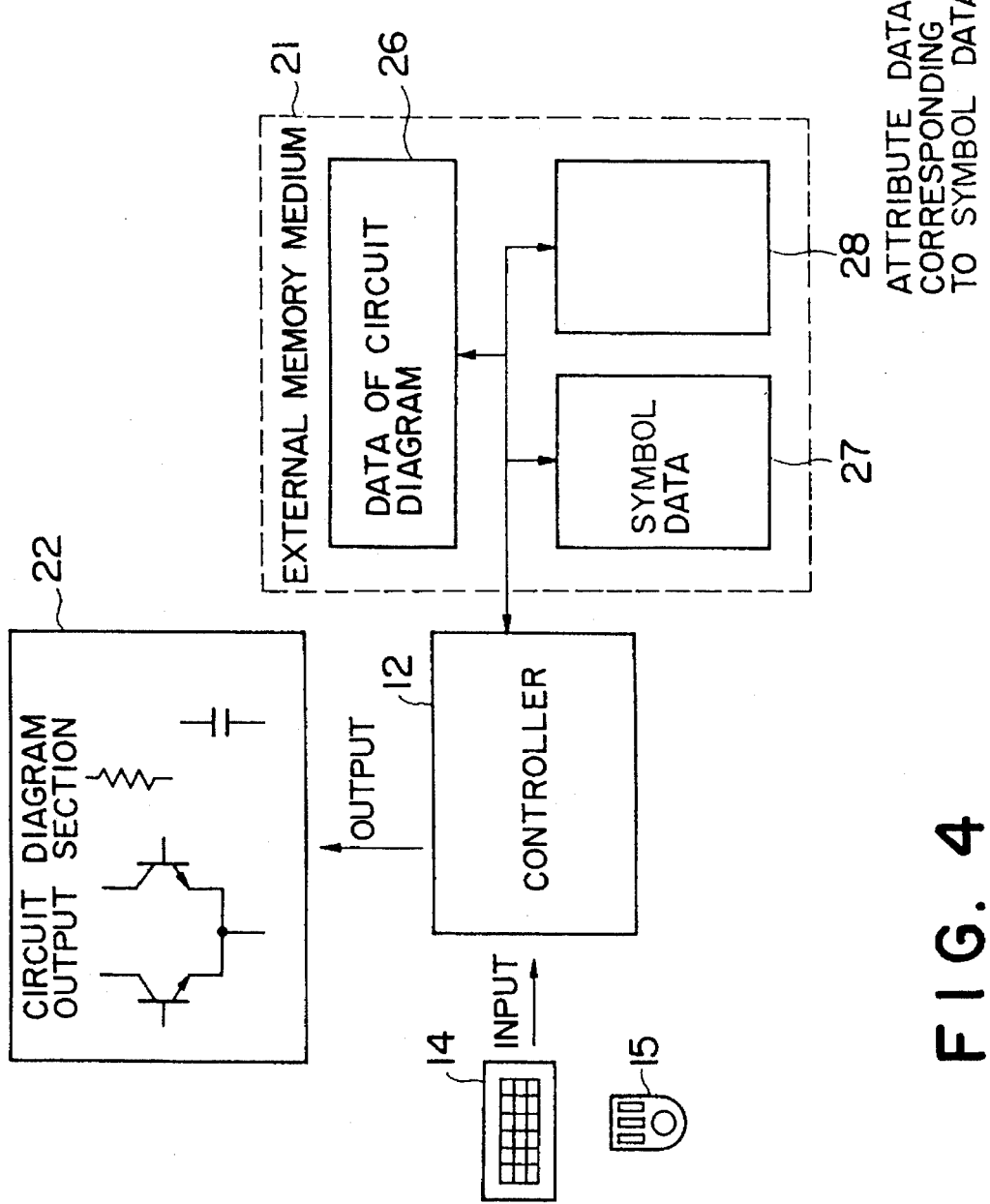
FIG. 4 is an explanatory view showing display contents of a circuit diagram output section in the devices and contents of data stored in an external memory medium.
Figure 5:
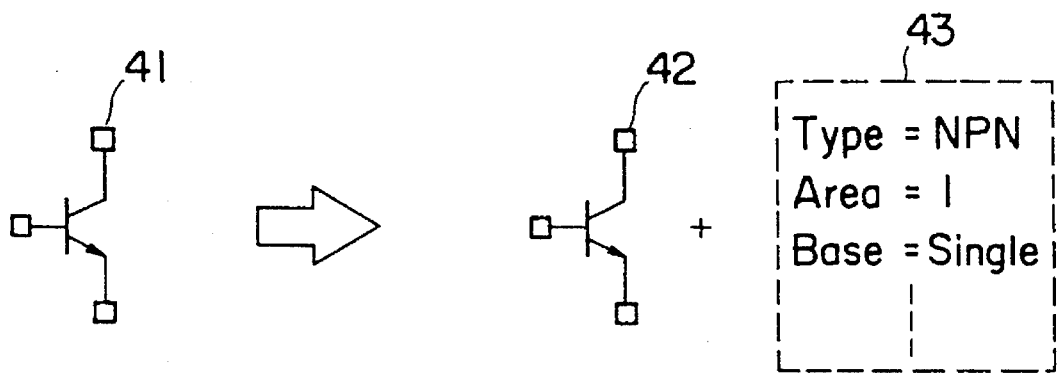
FIG. 5 is an explanatory view showing the relationship between the display contents in the circuit diagram output section, and symbol data and attribute data stored in the external memory medium.

FIG. 4 shows symbols of a transistor, a resistor and a capacitor displayed on a circuit diagram output section 22 such as the CRT display 11, the printer 16 and the plotter 17, and data 26 of a circuit diagram, a plurality of symbol data 27 and attribute data 28 corresponding to the symbols 27 stored in an external memory medium 21. Further, FIG. 5 shows the relationship in which a symbol 41 is displayed on the circuit diagram output section 22 on the basis of symbol data 42 and attribute data 43 stored in the external memory medium 21.

Figure 6:
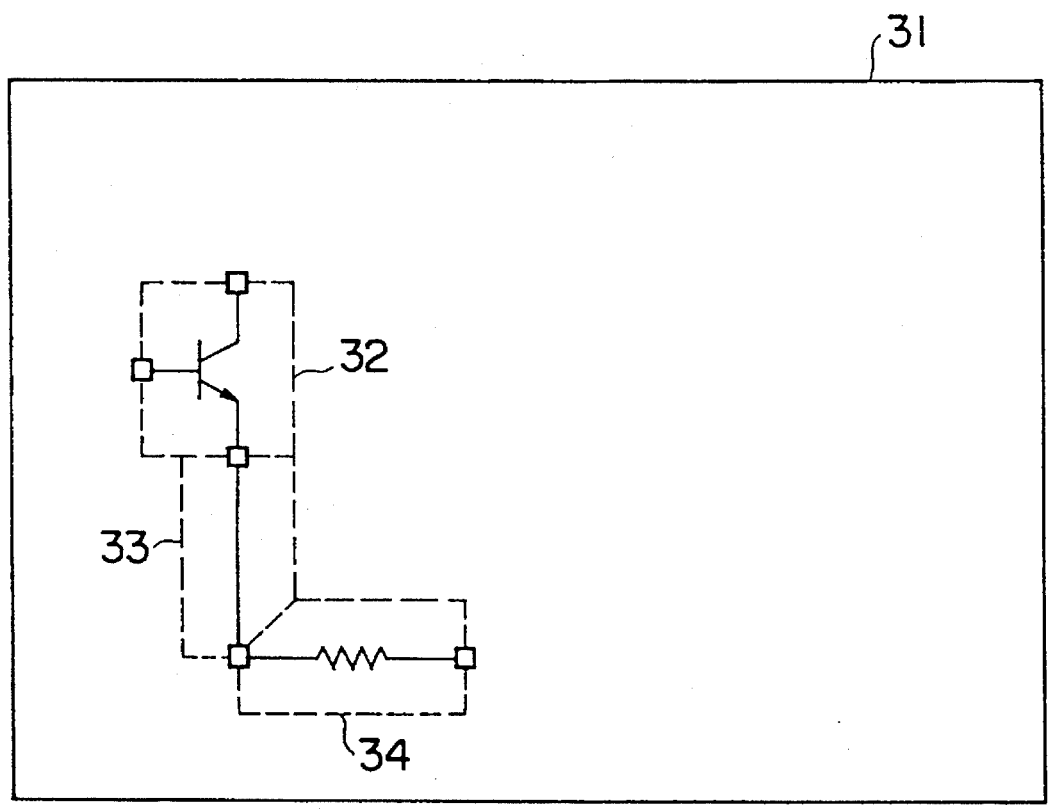
FIG. 6 is an explanatory view showing symbols of the respective fundamental elements.

Next, FIG. 6 shows a display example of symbols of respective fundamental elements constituting the interior of a specific semiconductor circuit. Symbols 32, 33 and 34 indicate a bipolar transistor, a wiring and a resistor, respectively.

Attribute data of the bipolar transistor include, for example, polarities of a transistor, an area of an emitter, a shape of an emitter, the number of emitters, a shape of a base, an area of a base, a shape of a collector or an area of a collector.

Attribute data of the resistor include material of a resistor, resistivity (sheet resistance), structural features of a resistor, etc.

Attribute data of the wiring include material of a wiring, a set value of current to be flown into the wiring, an allowable value of current capable of being flown into the wiring, uses indicative of whether various signals flow into the wiring or power supply voltage is applied thereto, etc.

Attribute data of the diode include an area, a structural feature and uses of the diode, etc.

Attribute data of the capacitor include a kind and a structural feature of the capacitor, material for a dielectric, material for an electrode, etc.

Further, attribute data of FET not shown include the construction of a transistor, namely, either junction FET or MOS FET, a length of a gate, a width of a gate, the number of gates, the kind of materials for a gate electrode, a shape of a source electrode, a shape of a drain electrode, etc. With respect to the number of gates, it is general that the gate be widened in order to increase a conductance. In this case, with respect to the shape of elements, the gate is sometimes divided into plural numbers in consideration of the shape and the like. This refer to the number of gates when it is divided. In the MOS FET, there are a plurality of kinds of materials for the gate electrode. More specifically, there includes metal such as Al, silicon, an alloy of metal and silicon, etc. The shape of the source electrode is closely related to that of the drain electrode. In the normal FET, the source and drain electrodes are arranged in a stripe-like configuration. Polygons such as a square and an octagon, and a circle thereof are sometimes employed in consideration of the paired shape of the source and drain electrodes.

Attribute data of the pad include the construction, size and shape of the pad, the purpose for using the pad, the presence or absence of an element for protecting the pad, and the kind, number, area and polarity of the element for protecting the pad.

The construction of the pad herein termed includes whether or not an isolation island immediately below the pad is formed, whether or not a pad is formed for each of all wiring layers in the case where a multiple wiring can be formed, and whether or not a pad is formed on only a specific wiring layer (for example, an uppermost layer) in the case where a multiple wiring can be installed.

The size of a pad indicates the dimension of a pad. The shape of a pad is a geometrical shape such as polygons including a reguare square, a rectangle, an octagon, etc., and a circle.

The purpose for using a pad includes whether or not the object is to carry out normal bonding, whether or not the pad is a redundant pad for the change of an IC package, and whether or not the pad is a checking pad which performs checking by placing a probe in a wafer state.

The presence or absence of an element for protecting a pad means whether or not there is a protective element, which is sometimes related to the construction of a pad.

The kind of a pad protecting element includes a resistor, a bipolar transistor, FET or a composite protective circuit comprised of a combination of a plurality of plural kinds of these protective elements.

A signal for breaking a pad has polarities such as plus, minus or double polarities. The polarity of the pad protective element indicates which polarity of a breaking signal is an object for protecting the pad.

In the following, the processing procedure for the circuit diagram drawing method according to the present invention will be described. First, FIG. 1 shows a flowchart of the most fundamental drawing method.

First, as in Step 101, a check is made whether or not symbol data corresponding to attribute data is presently displayed by the circuit diagram output section 22.

In the case where both the data well correspond to each other and no contradiction comprises, the Step 101 terminates. In the case where both the data do not correspond to each other, a check is made whether or not symbol data corresponding to attribute data is present as in Step 102. In the case where symbol data corresponding to attribute data is not present, a rewrite is disabled. An error display is made as in Step 103. In the case where symbol data corresponding to attribute data is present, a rewrite of symbol data is made as in Step 104.

The above-mentioned processing can be likewise carried out also in the case where a rewrite of attribute data is made not limiting to the case where a check is made whether or not a symbol corresponding to attribute data is presently displayed. More specifically, it is possible to automatically change a symbol presently displayed on the picture plane to a symbol corresponding to attribute data after being rewritten, after the attribute data has been rewritten.

Figure 9:
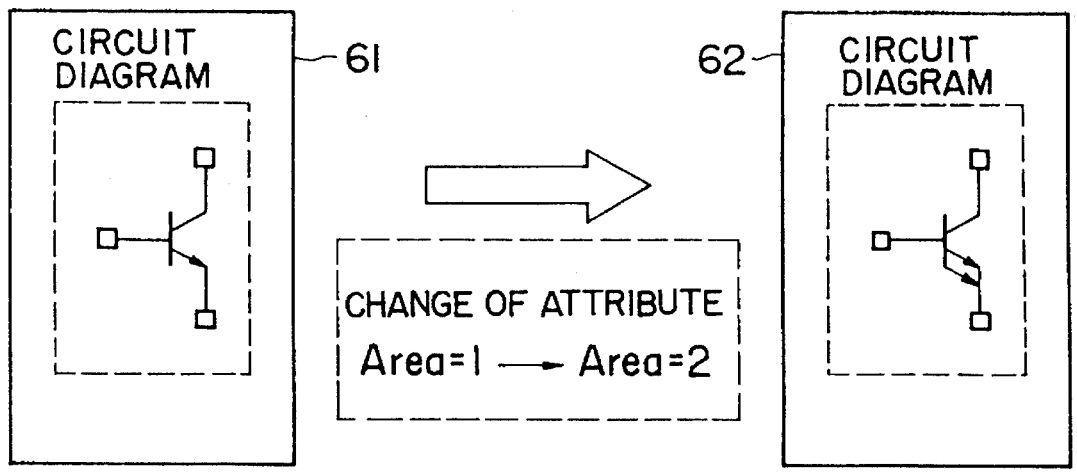
FIG. 9 is an explanatory view showing the changes of symbols in the case where the attribute data of a transistor is changed.
Figure 10:
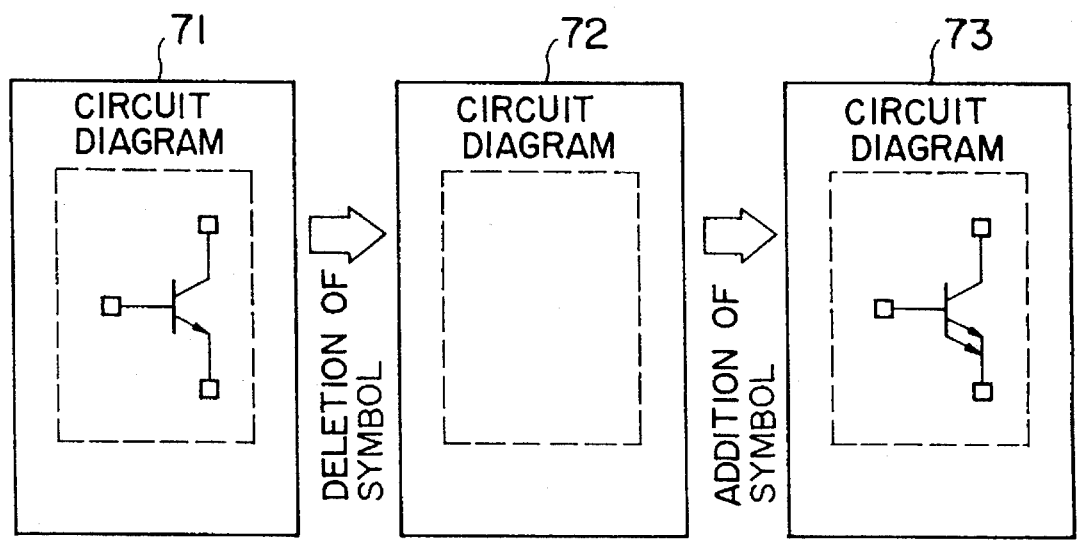
FIG. 10 is an explanatory view showing the changing procedure for symbols in the case where attribute data is changed in accordance with a conventional drawing method.

For example, FIG. 9 shows the case where an emitter area of a transistor is changed from 1 to 2. A symbol of a transistor whose emitter area is presently 1 is displayed on a picture plane 61. It is assumed that an emitter area is changed to 1 or 2. A new symbol indicative of a transistor corresponding to attribute data after changed is displayed on a picture plane 62.

FIGS. 8(*a*) to 8(*d*) show the changes of symbol data in the case where attribute data is changed in other fundamental elements. In the case where a change is made from the case of using a $p^+$ type impurity region as attribute data of a resistor to the case of using a $p^-$ type impurity region, a change of symbols is made as in FIG. 8(*a*). A change of symbols in the case where a change is made from an NPN type to a PNP type as attribute data of a transistor is shown in FIG. 8(*b*). FIG. 8(*c*) shows a change of symbols from the case of using, as attribute data of a bipolar transister, the attribute data in a state having a linear characteristic instead of a saturated state to the case of using the attribute data in a saturated state, for example, in a manner so as to effect a switching operation. FIG. 8(*d*) shows a change of symbols in the case where a change is made from a wiring for transferring a signal to a wiring for supplying a ground voltage, as attribute data of a wiring.

Figure 7:
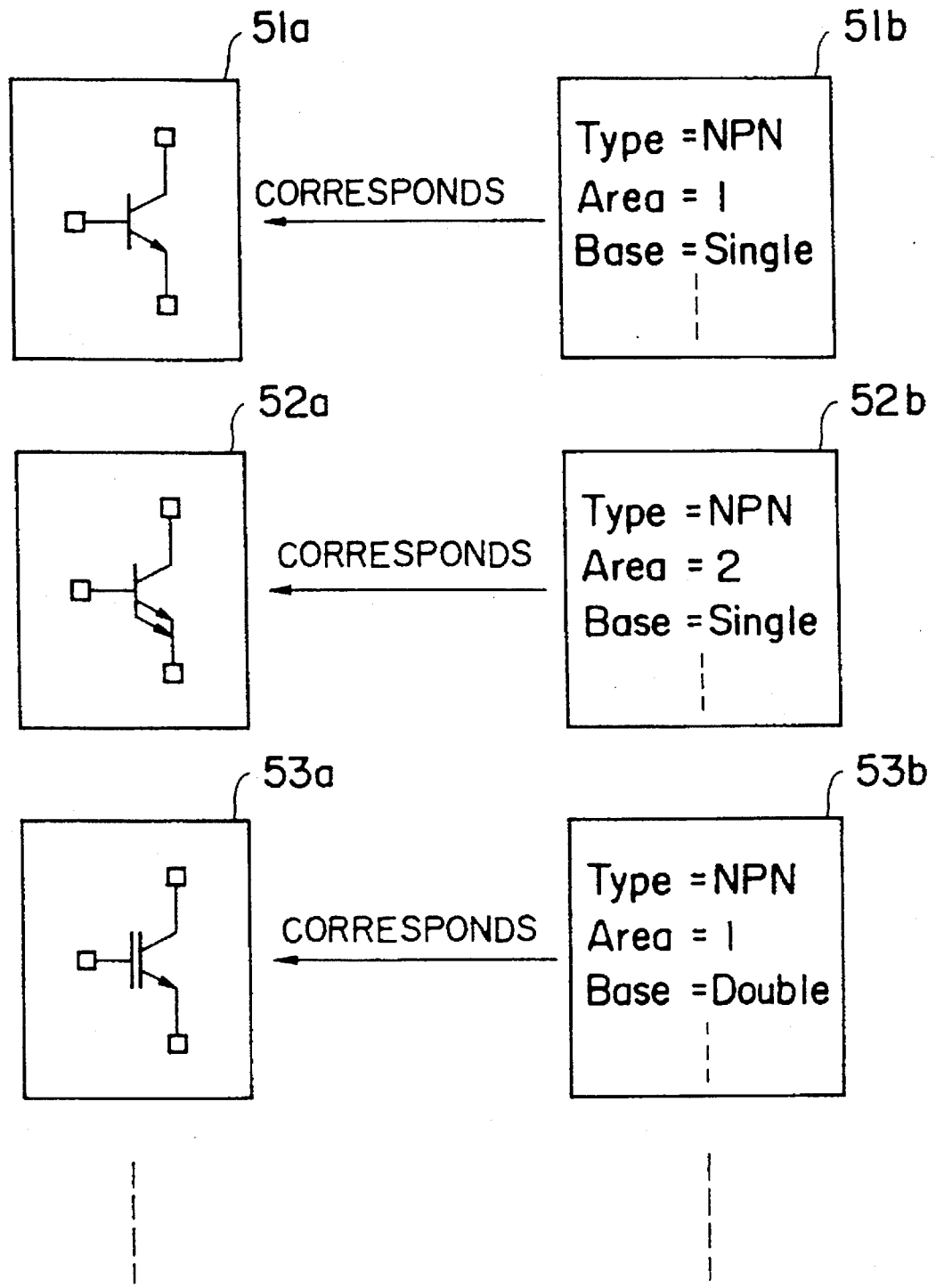
FIG. 7 is an explanatory view showing the changes of symbols in the case where a plurality of attribute data of a transistor are changed.
Figure 8A:
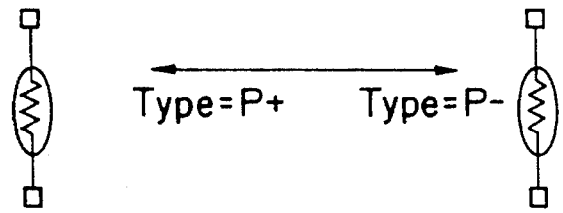
FIGS. 8(a) to 8(d) are respectively explanatory views of the changes of symbols with the changes of respective attribute data of various fundamental elements.
Figure 8B:
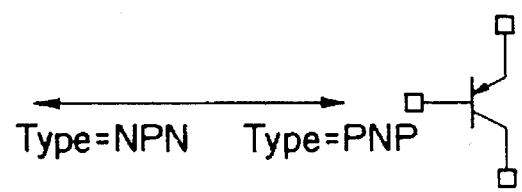
Figure 8C:
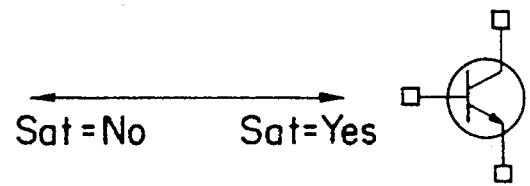
Figure 8D:
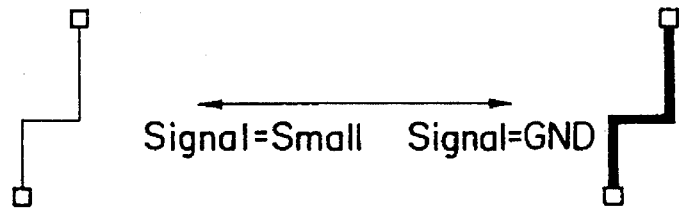

The drawing method according to the present embodiment can be likewise applied to the case where a plurality of attribute data are changed, and symbol data are rewritten. The processing in this case will be described with reference to FIG. 7. A check is made whether or not a symbol corresponding to attribute data displayed on a picture plane 51*b* is presently displayed on a picture plane 51*a*. If the correspondence is obtained, a display of the symbol is maintained.

In the case where attribute data is changed from the picture plane 51*b* to a picture plane 52*b* and an emitter area is increased to 2, symbol data to be displayed is also changed such that the symbol data to be displayed is displayed on the picture plane 51 so as to correspond to the attribute data.

In the case where attribute data is changed as displayed on a picture plane 53*b* and an emitter area and a base area are changed to 1 and 2, respectively, symbol data to be displayed is changed to that corresponding to the attribute data after changed as displayed on a picture plane 53*a*.

Figure 2:
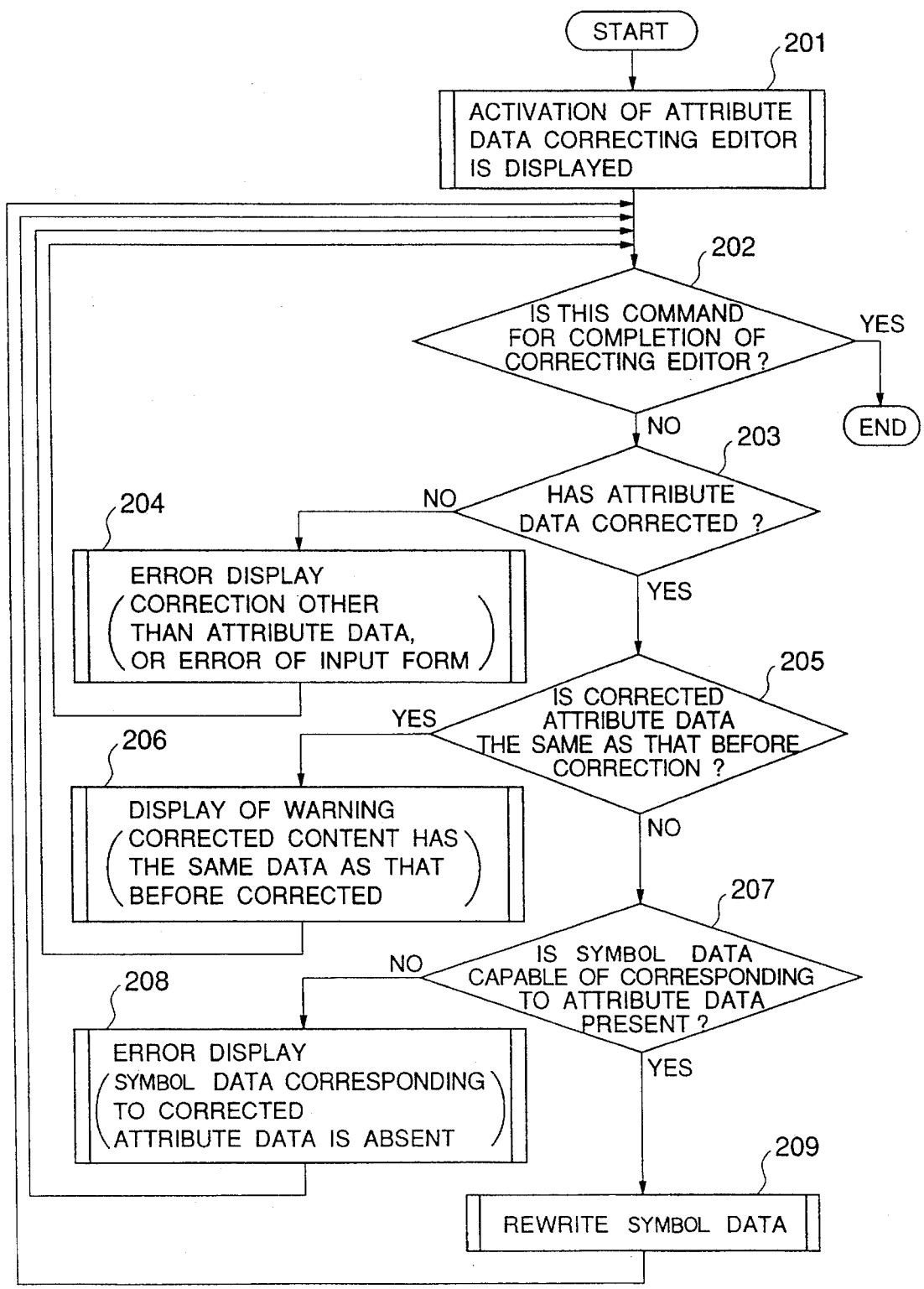
FIG. 2 is a flowchart showing the processing procedure of a circuit diagram drawing method according to a further embodiment of the present invention.

FIG. 2 shows a flowchart of an drawing method including a correction routine of attribute data according to another embodiment of the present invention.

First, in Step 201, a display is made whether or not a correction editor as a routine for correcting attribute data is activated.

A judgement is made whether or not a command for completing the correction editor is inputted. If the command is inputted, the step is completed.

If the completing command is not inputted, a judgement is made whether or not attribute data is corrected in Step 203.

If the attribute data is not corrected, it is considered that inadequate data was inputted as attribute data, for example. An error display indicative of an error of input is made in Step 204.

If the attribute data is corrected, a judgement is made in Step 205 whether or not the corrected attribute data coincides with the attribute data prior to correction. If both the data coincide with each other, useless processes such as the rewrite of symbol data need not be performed. Therefore, an alarm display indicative of that both of the data are the same is made in Step 206.

If attribute data before correction is different from that after correction, a judgement is made in Step 207 whether or not symbol data corresponding to the attribute data is present. If the symbol data corresponding to the attribute data is not present, an error display is made in Step 208. If it is present, symbol data to be displayed is rewritten in Step 209.

In the above-mentioned embodiment, the change of the attribute data means the change of the attribute data within the fundamental elements of the same kind. For example, no change is included in relation to fundamental elements of different kind such as from a bipolar transistor to a resistor. The change from an NPN bipolar transistor to a PNP bipolar transistor is included in the change according to the present invention since such change is a change of polarity within the bipolar transistor of the same kind. The change from a junction transistor within FET to a MOS transistor is included in the change according to the present invention since such change is a change of construction of a transistor in FET of the same kind.

With respect to the relationship between attribute data and symbol data, if attribute data of a certain fundamental element is decided, symbol data corresponding thereto is decided. However, attribute data corresponding to one symbol data is not always decided to one but plural kinds of attribute data may be sometimes made to correspond thereto. For example, attribute data indicative of numerical value such as a gate length of FET and an area of a pad has an infinite range, in principle. Therefore, in fact, it is impossible that attribute data be made to correspond to symbol data in the relation of 1:1. It is supposed that the attribute data and the symbol data made in correspondence in the relation of 1:1 as described above are controlled as data base. Then, it becomes necessary to register new attribute data, changed attribute data and symbol data corresponding thereto whenever design is made. Accordingly, the working efficiency is poor, and an extremely large capacity of the memory medium 21 is necessary.

In the present invention, attribute data is decided, and a judgement is made whether or not a symbol corresponding to the attribute data is displayed. Thereby, there is no need to store the attribute data and the symbol data in the relation of 1:1.

According to the above-described embodiments, in the case where the attribute data of the respective fundamental element is changed, it is automatically changed to the symbol data corresponding to the attribute data. Therefore, in preparing a circuit diagram, attribute data can be extremely easily changed without being conscious of a symbol, thus relieving a burden on a user. Further, it is possible to avoid the situation that after changed, the attribute data does not coincide with the symbol data.

The above-described embodiments merely show one example, and the present invention is not limited. For example, attribute data of respective fundamental elements are not limited to those mentioned in the embodiment but include attribute data which are necessary in designing a semiconductor circuit.

What is claimed is:

1. A method for drawing a circuit diagram using drawing means for drawing a circuit diagram, and memory means for storing symbol data representative of symbols of fundamental elements constituting said circuit diagram and attribute data representative of attributes of said fundamental elements, said fundamental elements including a bipolar transistor, an FET, a resistor, a capacitor, a diode, a wiring and a pad, said method comprising the steps of:
  judging whether or not, in the fundamental elements of the same kind, the symbol represented by the symbol data corresponding to the attribute data of the fundamental element is presently displayed by the drawing means;
  judging whether or not, when the symbol corresponding to the attribute data is not presently displayed, the symbol data representative of the symbol corresponding to the attribute data is stored in the memory means; and
  replacing, when the symbol data representative of the symbol corresponding to the attribute data is stored in the memory means, the symbol presently displayed with the symbol represented by the symbol data corresponding to the attribute data to express the changed symbol on the drawing means.

2. The circuit diagram drawing method according to claim 1, wherein attribute data of said bipolar transistor include at least one of a polarity of a transistor, an emitter area, an emitter shape, a number of emitters, a shape of a base, a base area, a collector shape or a collector area.

3. The circuit diagram drawing method according to claim 1, wherein attribute data of said FET include at least one of a construction of a transistor, a gate length, a gate width, a number of gates, a kind of material of a gate electrode, a shape of a source electrode, and a shape of a drain electrode.

4. The circuit diagram drawing method according to claim 1, wherein attribute data of said resistor include at least one of material for a resistor, a resistivity and a construction.

5. The circuit diagram drawing method according to claim 1, wherein attribute data of said capacitor include at least one of a kind of a capacitor, a construction of a capacitor, a dielectric substance and an electrode substance.

6. The circuit diagram drawing method according to claim 1, wherein attribute data of said diode include at least one of an area, a construction and a use of a diode.

7. The circuit diagram drawing method according to claim 1, wherein attribute data of said wiring include at least one of a material of a wiring, an allowable value of current capable of flowing into a wiring, and a use.

8. The circuit diagram drawing method according to claim 1, wherein attribute data of said pad include at least one of a construction of a pad, a size of a pad, a shape of a pad, a purpose for using a pad, the presence or absence of a pad protective element, a kind of a pad protective element, a number of pad protective elements, an area of a pad protective element, and a polarity of a pad protective element.

9. A method for drawing a circuit diagram using drawing means for drawing a circuit diagram, and memory means for storing symbol data representative of symbols of fundamental elements constituting said circuit diagram and attribute data representative of attributes of said fundamental elements, said fundamental elements including a bipolar transistor, an FET, a resistor, a capacitor, a diode, a wiring and a pad, said method comprising the steps of:
  a first judging step of judging whether or not, among fundamental elements of the same type, the attribute data is corrected;
  a first displaying step of displaying an indication that an error of input is made on the drawing means, when the judgment is made that the attribute data is not corrected in the first judging step;
  a second judging step of judging whether or not the corrected attribute data coincides with the attribute data prior to correction, when the judgment is made that attribute data is corrected in the first judging step;
  a second displaying step of displaying an indication that the corrected attribute data is the same as the attribute data prior to correction on the drawing means, when the judgment is made that the corrected attribute data coincides with the attribute data prior to correction in the second judging step;
  a third judging step of judging whether or not the symbol data representative of the symbol corresponding to the corrected attribute data is stored in the memory means, when the judgment is made that the corrected attribute data does not coincide with the attribute data prior to correction in the second judging step;
  a third displaying step of displaying the symbol represented by the symbol data corresponding to the corrected attribute data on the drawing means by replacing the symbol presently displayed with the changed symbol, when the judgment is made that the symbol data representative of the symbol corresponding to the corrected attribute data is stored in the memory means; and
  a fourth displaying step of displaying an error indication on the drawing means.

10. The circuit diagram drawing method according to claim 9, wherein attribute data of said bipolar transistor include at least one of a polarity of a transistor, an emitter area, an emitter shape, a number of emitters, a shape of a base, a base area, and a collector shape or a collector area.

11. The circuit diagram drawing method according to claim 9, wherein attribute data of said FET include at least one of a construction of a transistor, a gate length, a gate width, a number of gates, a kind of material of a gate electrode, a shape of a source electrode, and a shape of a drain electrode.

12. The circuit diagram drawing method according to claim 9, wherein attribute data of said resistor include at least one of material for a resistor, a resistivity, and a construction.

13. The circuit diagram drawing method according to claim 9, wherein attribute data of said capacitor include at least one of a type of a capacitor, a construction of a capacitor, a dielectric substance, and an electrode substance.

14. The circuit diagram drawing method according to claim 9, wherein attribute data of said diode include at least one of an area, a construction, and a use of a diode.

15. The circuit diagram drawing method according to claim 9, wherein attribute data of said wiring include at least one of material of a wiring, an allowable value of current capable of flowing into a wiring, and a use.

16. The circuit diagram drawing method according to claim 9, wherein attribute data of said pad include at least one of a construction of a pad, a size of a pad, a shape of a pad, a purpose for using a pad, the presence or absence of a pad protective element, a kind of a pad protective element, a number of pad protective elements, an area of a pad protective element, and a polarity of a pad protective element.

* * * * *